United States Patent
Watanabe (10) Patent No.: US 7,308,208 B2
(45) Date of Patent: Dec. 11, 2007

(54) GAIN MONITORING METHOD FOR OPTICAL AMPLIFIER AND APPARATUS THEREOF

(75) Inventor: Manabu Watanabe, Yokohama (JP)

(73) Assignee: Fujitsu Limited, Kawasaki (JP)

(*) Notice: Subject to any disclaimer, the term of this patent is extended or adjusted under 35 U.S.C. 154(b) by 663 days.

(21) Appl. No.: 10/928,214

(22) Filed: Aug. 30, 2004

(65) Prior Publication Data

US 2005/0213990 A1    Sep. 29, 2005

(30) Foreign Application Priority Data

Mar. 24, 2004  (JP) ............................ 2004-087265

(51) Int. Cl.
*H04B 10/00* (2006.01)
(52) U.S. Cl. ............... 398/177; 398/37; 359/341.4
(58) Field of Classification Search ........ 398/173–181, 398/37; 359/341.4–341.44
See application file for complete search history.

(56) References Cited

U.S. PATENT DOCUMENTS

| | | | |
|---|---|---|---|
| 5,461,497 A * | 10/1995 | Mackichan | ................. 398/181 |
| 5,471,334 A | 11/1995 | Masuda et al. | |
| 5,703,711 A * | 12/1997 | Hamada | ................. 359/341.41 |
| 6,064,501 A * | 5/2000 | Roberts et al. | ................. 398/11 |
| 6,163,399 A * | 12/2000 | Berg | ................. 359/337.13 |
| 6,246,514 B1 * | 6/2001 | Bonnedal et al. | ........ 359/341.41 |
| 6,337,764 B1 * | 1/2002 | Yoon et al. | ............ 359/341.41 |
| 6,466,348 B1 * | 10/2002 | Izumi | ........................ 398/177 |
| 6,483,630 B2 * | 11/2002 | Kosaka | ................. 359/337.11 |
| 6,529,316 B1 * | 3/2003 | Treyz et al. | ........... 359/337.11 |
| 6,639,716 B1 | 10/2003 | Tomofuni | |
| 6,738,185 B2 * | 5/2004 | Nakaji | ................. 359/341.41 |
| 6,751,014 B2 * | 6/2004 | DeCusatis et al. | ...... 359/341.41 |
| 6,836,355 B2 * | 12/2004 | Lelic et al. | .............. 359/341.4 |
| 6,922,532 B2 * | 7/2005 | Simard et al. | ............. 398/177 |
| 7,042,634 B2 * | 5/2006 | Aozasa et al. | ......... 359/341.41 |
| 7,061,668 B2 * | 6/2006 | Maurer et al. | ......... 359/341.41 |

FOREIGN PATENT DOCUMENTS

| | | |
|---|---|---|
| JP | 06-132905 | 5/1994 |
| JP | 08-018136 | 1/1996 |
| JP | 2000-232433 A | 8/2000 |

* cited by examiner

*Primary Examiner*—Agustin Bello
(74) *Attorney, Agent, or Firm*—Staas & Halsey LLP

(57) ABSTRACT

An object of the invention is to realize a gain monitoring method for an optical amplifier and an apparatus thereof, capable of detecting a gain for a signal light regardless of a noise light generated inside the optical amplifier. To this end, in the gain monitoring method according to the present invention, a part of a signal light input to an optical amplifier is branched as an input monitor light, and the input monitor light is modulated, and also a part of a light output from the optical amplifier is branched as an output monitor light, so that the modulated input monitor light and the output monitor light are multiplexed. Then, the multiplexed light is converted into an electrical signal, an interference component contained in the electrical signal is extracted, and a gain for the signal light in the optical amplifier is detected based on the interference component.

11 Claims, 5 Drawing Sheets

WAVEFORM OF INPUT MONITOR LIGHT M1

WAVEFORM OF OUTPUT MONITOR LIGHT M3

WAVEFORM OF INPUT MONITOR LIGHT M2 AFTER INTENSITY MODULATION

WAVEFORM OF MULTIPLEXED LIGHT M4

GAIN MONITORING METHOD FOR OPTICAL AMPLIFIER AND APPARATUS THEREOF

BACKGROUND OF THE INVENTION

1. Field of the Invention

The present invention relates to a gain monitoring method and an apparatus thereof, for monitoring accurately a signal gain in an optical amplifier used for optical communications.

2. Description of the Related Art

In optical fiber communications, the introduction of a wavelength division multiplexing (WDM) system has been made as a system for increasing the transmission capacity. In the WDM system, an optical amplifier for compensating for a transmission loss in an optical fiber is used, to enable the long-distance transmission. As the optical amplifier used for the WDM system, for example, there is used a rare-earth element doped optical fiber amplifier, a Raman amplifier, or a semiconductor optical amplifier. As an optical amplifier mostly introduced into a practical system, there is an erbium doped optical fiber amplifier (EDFA). The EDFA has become in practical use as the optical amplifier capable of amplifying a light in a C-band (conventional band) of 1530 nm to 1566 nm being a wavelength band in which a loss of optical fiber is low, or a light in an L-band (long wavelength band) of 1570 nm to 1610 nm. Further, in recent years, the introduction of semiconductor optical amplifier has been studied for the purpose of compensating for an optical loss during optical transmission for a short or middle distance in a metro-network or the like.

In these optical amplifiers, it is typical to perform a control of an optical amplification operation, such as, a gain constant control (automatic gain control: AGC) for controlling a signal light gain, which is a ratio between input signal light power and output signal light power to and from the optical amplifier, to be constant, an output constant control (automatic level control: ALC) for controlling the output signal light power to be constant, or the like (refer to Japanese Unexamined Patent Publication No. 8-18136).

Figure 8:
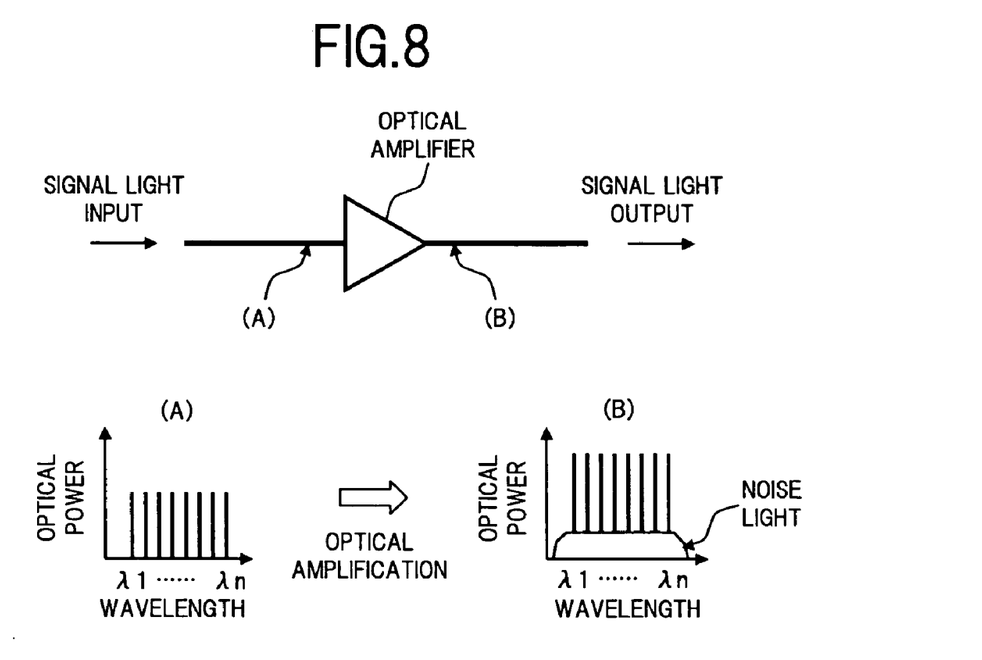
FIG. 8 is a diagram for explaining a noise light generated inside the optical amplifier.

In the optical amplifier as described above, for example as shown in FIG. 8, a light (amplified spontaneous emission (ASE) light), which is a result that a spontaneous emission light output due to the spontaneous emission from the pumping level is amplified, is generated to be output as a noise light together with a signal light. Therefore, in order to control the signal light gain to be constant by the AGC or to control the output light power to be constant by the ALC, it is necessary to estimate a generation amount of the noise light generated inside the optical amplifier.

In the conventional optical amplifier, for example, the generation amount of the noise light is set as a function of the input light power to the optical amplifier, to calculate the generation amount of the noise light according to a monitor result of the input light power, and a control error in the optical amplification operation is corrected based on the calculation result (refer to Japanese Unexamined Patent Publication No. 2000-232433). Moreover, there has been known a technique in which a noise light is extracted from an output light of an optical amplifier utilizing an optical filer for noise light elimination, to monitor the power of the noise light, thereby supervising a noise figure of the optical amplifier (refer to Japanese Unexamined Patent Publication No. 6-132905).

However, in the conventional technique described above, there is a problem in that the generation amount of the noise light generated inside the optical amplifier is hardly to be accurately detected. Namely, in the case where the generation amount of the noise light is calculated according to the input light power to the optical amplifier, the generation amount of the noise light is indirectly obtained based on a measurement result of the input light power, and accordingly, an actually generated noise light is not directly detected. Therefore, there is a possibility of an error in the calculated generation amount of the noise light. Further, in the case where the power of the noise light is monitored utilizing the optical filter for noise light elimination, since the noise light power in a band deviated from a signal light wavelength is monitored, there is a possibility of an error due to a difference of wavelength. In a system where the optical amplifiers are connected in multi-stages for example, such an error in the generation amount of the noise light in each stage is gradually accumulated even if the error in each stage is slight. Therefore, there is caused a problem of the accuracy reduction in the AGC, ALC or the like. In order to realize a high accurate control, it is desired that the actually generated noise light power can be accurately detected or the power of the signal light which does not contain the noise light is detected to perform the AGC or the like.

SUMMARY OF THE INVENTION

The present invention has been accomplished in view of the above problems, and it is an object of the present invention to realize a gain monitoring method and an apparatus thereof, capable of detecting a gain of a signal light regardless of a noise light generated inside an optical amplifier, and to provide an apparatus capable of controlling with high accuracy an operation of the optical amplifier using the same.

In order to achieve the object, a gain monitoring method for an optical amplifier according to the present invention comprises: (A) branching a part of a signal light input to the optical amplifier as an input monitor light; (B) branching a part of a light output from the optical amplifier as an output monitor light; (C) modulating the branched input monitor light; (D) multiplexing the modulated input monitor light and the branched output monitor light; (E) receiving the multiplexed monitor light to convert it into an electrical signal, and thereafter, extracting an interference component generated due to the modulated input monitor light and the branched output monitor light, which is contained in the electrical signal; and (F) detecting a gain for the signal light in the optical amplifier based on the extracted interference component.

Further, a gain monitoring apparatus for an optical amplifier according to the present invention comprises: a first optical branching section that branches a part of a signal light input to the optical amplifier as an input monitor light; a second optical branching section that branches a part of a light output from the optical amplifier as an output monitor light; a modulating section that modulates the input monitor light branched in the first optical branching section; a multiplexing section that multiplexes the input monitor light modulated in the modulating section and the output monitor light branched in the second optical branching section; an optical detecting section that receives the multiplexed light output from the multiplexing section to convert it into an electrical signal; a filter section that extracts an interference component generated due to the input monitor light modulated in the modulating section and the output monitor light branched in the second optical branching section, which is contained in the electrical signal output from the optical detecting section; and a gain detecting section that detects a gain for the signal light in the optical amplifier based on the interference component extracted in the filter section.

In the gain monitoring method for the optical amplifier and the apparatus thereof as described above, a part of the signal light input to the optical amplifier is branched as the input monitor light to be modulated, and also a part of the signal light output from the optical amplifier is branched as the output monitor light, and then, the modulated input monitor light and the output monitor light are multiplexed with each other. As a result, the multiplexed light contains the interference component (beat component), which is changed in proportion to the gain of the optical amplifier regardless of a noise light generated in the optical amplifier, due to the interference by the input monitor light and the output monitor light. Therefore, by extracting the interference component from the electrical signal obtained by photo-electrically converting the multiplexed light, it becomes possible to detect the gain for the signal light in the optical amplifier.

As a result, according to the gain monitoring method for the optical amplifier and the apparatus thereof in the present invention, it is possible to accurately detect the gain for the signal light regardless of the noise light generated inside the optical amplifier. If an operation of the optical amplifier is controlled utilizing the method and apparatus, it becomes possible to realize a high accurate operation control.

Other objects, features and advantages of the present invention will become apparent from the following explanation of the embodiments, in conjunction with the appended drawings.

DESCRIPTION OF THE PREFERRED EMBODIMENTS

There will be described embodiments for implementing the present invention, with reference to the accompanying drawings. The same reference numerals denote the same or equivalent parts in all drawings.

Figure 1:
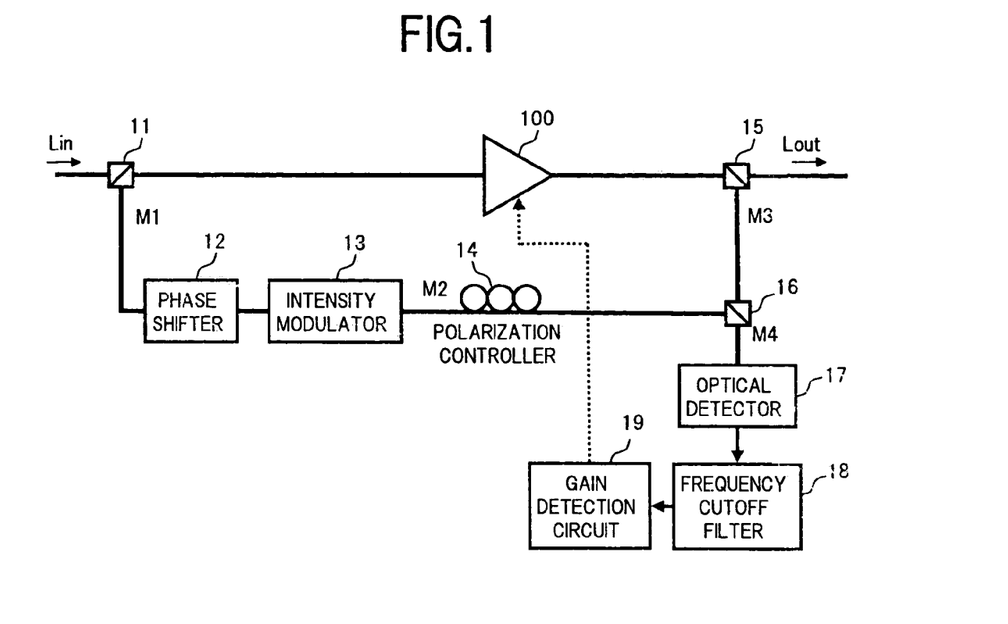
FIG. 1 is a block diagram showing one embodiment of an apparatus applied with a gain monitoring method for an optical amplifier according to the present invention.

FIG. 1 is a block diagram showing one embodiment of an apparatus applied with a gain monitoring method for an optical amplifier according to the present invention.

In FIG. 1, the present apparatus comprises: an optical branching device 11 as a first branching section that branches a part of a signal light Lin input to an optical amplifier 100, as an input monitor light; a phase shifter 12 as a phase adjusting section that adjusts a phase of the input monitor light; an intensity modulator 13 as a modulating section that modulates the input monitor light output from the phase shifter 12; a polarization controller 14 as a polarization state adjusting section that controls a polarization state of the modulated input monitor light; an optical branching device 15 as a second optical branching section that branches a part of a signal light Lout output from the optical amplifier 100, as an output monitor light; an optical multiplexer 16 as an optical multiplexing section that multiplexes the input monitor light output from the polarization controller 14 and the output monitor light output from the optical branching device 15; an optical detector 17 as an optical detecting section that detects the multiplexed light; a frequency cutoff filter (BPF) 18 as a filter section that extracts an interference component (to be described later) from an electrical signal output from the optical detector 17; and a gain detection circuit 19 as a gain detecting section that detects a signal gain in the optical amplifier 100 based on a voltage level of the electrical signal passed through the frequency cutoff filter 18.

The optical amplifier 100 is a known optical amplifier, which outputs the input signal light Lin after amplification, and generates a noise light with an optical amplification operation thereof. As a specific example of the optical amplifier 100, there is a rare-earth element doped fiber amplifier, a Raman amplifier, a semiconductor optical amplifier or the like.

The optical branching device 11 branches the light given to an input port thereof at a previously set proportion, and outputs one of the branched lights to the optical amplifier 100 while outputting the other branched light to the phase shifter 12 as an input monitor light M1.

The phase shifter 12 adjusts a phase of the input monitor light M1 output from the optical branching device 11, so that phases of the input side and output side monitor lights to be multiplexed by the optical multiplexer 16, are aligned. As the phase shifter 12, it is possible to use a known optical device having a configuration to change a phase utilizing the alteration in refractive index due to a thermal optical effect and the like. However, the configuration of the phase shifter 12 is not limited to the above example. Further, although one example is shown in which the phase shifter 12 is arranged on an optical path between the optical branching device 11 and the intensity modulator 13, the arrangement of the phase shifter 12 can be changed, and accordingly, the phase shifter 12 may be arranged on an arbitrary position on the optical path between the optical branching device 11 and the optical multiplexer 16, through which the input monitor light is propagated, or on an arbitrary position on the optical path between the optical branching device 15 and the optical multiplexer 16, through which the output monitor light is propagated.

The intensity modulator 13 modulates the intensity of the input monitor light output from the phase shifter 12 in accordance with a modulation signal having a frequency $2 \cdot \omega_f$ sufficiently lower than a modulation frequency of the signal light Lin input to the optical amplifier 100. To be specific, it is desirable that the modulation frequency $2 \cdot \omega_f$ in this intensity modulator 13 is set to be lower than the modulation frequency of the signal light Lin by two digits or above. For example, in the case where the modulation frequency of the signal light Un is 10 GHz, it is preferable to set the modulation frequency in the intensity modulator 13 at about several tens MHz to several hundreds MHz. As a specific example of such an intensity modulator 13, it is possible to use the one performing the intensity modulation on the monitor light using a magnetic optical device or a Pockels cell. Note, although one example is shown in which the intensity modulation is performed on the input monitor light, the present invention is not limited to this example, and the input monitor light may be modulated by another modulation system other than the intensity modulation.

The polarization controller 14 adjusts a polarization state of an input monitor light M2 output from the intensity modulator 13, so that polarization states of the input and output monitor lights to be multiplexed by the optical multiplexer 16 are coincident with each other. Note, one example is shown in which the polarization controller 14 is arranged on the optical path between the intensity modulator 13 and the optical multiplexer 16. However, the arrangement of the polarization controller 14 can be changed, and the polarization controller 14 may be arranged on an arbitrary position on the optical path between the optical branching device 11 and the optical multiplexer 16, through which the input monitor light is propagated, or on an arbitrary position on the optical path between the optical branching device 15 and the optical multiplexer 16, through which the output monitor light is propagated.

The optical branching device 15 branches the light output from the optical amplifier 100 at a previously set proportion, and outputs one of the branched lights to the outside as an output signal light Lout while outputting the other branched light to the optical multiplexer 16 as an output monitor light M3.

The optical multiplexer 16 is given with the input monitor light M2 output from the polarization controller 14 at one of input ports thereof and with the output monitor light M3 branched by the optical branching device 15 at the other input port thereof, and multiplexes the input monitor light M2 and the output monitor light M3 using a half-mirror or the like, to output a multiplexed light M4 to the optical detector 17.

The optical detector 17 receives the multiplexed light M4 output from the optical multiplexer 16, and generates an electrical signal whose voltage level is changed according to the power of the multiplexed light M4, to output the electrical signal to the frequency cutoff filter 18.

The frequency cutoff filter 18 is an electrical filter having a narrow passband with a frequency $\omega_f$ half (½ times) the modulation frequency $2 \cdot \omega_f$ in the intensity modulator 13 as the center, which extracts the interference component (beat component) generated due to the modulated input monitor light and the output monitor light, which is contained in the electrical signal output from the optical detector 17, to output the interference component to the gain detection circuit 19. As a specific example of this frequency cutoff filter 18, it is possible to use a bandpass filter, a lock-in amplifier or the like.

The gain detection circuit 19 obtains the signal gain in the optical amplifier 100 according to the voltage level of the electrical signal of the frequency $\omega_f$ passed through the frequency cutoff filter 18, to output a signal indicating the signal gain to the optical amplifier 100. In the optical amplifier 100, an AGC, an ALC or the like is performed based on the output signal from the gain detection circuit 19.

Next, an operation of the present embodiment will be described.

In the apparatus of the above configuration, a part of the signal light Lin input to the optical amplifier 100 is branched by the optical branching device 11 as the input monitor light M1, and the input monitor light M1 is given to the intensity modulator 13 via the phase shifter 12 to be subjected to the intensity modulation at the frequency $2 \cdot \omega_f$. The intensity modulated input monitor light M2 is sent to the optical multiplexer 16 via the polarization controller 14.

On the other hand, the signal light Lin passed through the optical branching device 11 is input to the optical amplifier 100 to be amplified up to a required level. At this time, in the optical amplifier 100, the noise light is generated due to the amplification operation of the signal light, to be output together with the signal light (refer to FIG. 8). A part of the output light Lout from the optical amplifier 100 is branched by the optical branching device 11 to be sent to the optical multiplexer 16 as the output monitor light M3.

Here, the input monitor light M2 and the output monitor light M3, reached the optical multiplexer 16, are signals of the phases aligned with each other and the polarization states coincident with each other, as a result that the phase and the polarization state of the input monitor light M2 are adjusted, respectively, by the phase shifter 12 and the polarization controller 14 arranged on the monitoring optical path on an input side. Such input monitor light M2 and output monitor light M3 are multiplexed by the optical multiplexer 16, so that the multiplexed light M4 having the beat component of the frequency $\omega_f$ is output to the optical detector 17.

Figure 2:
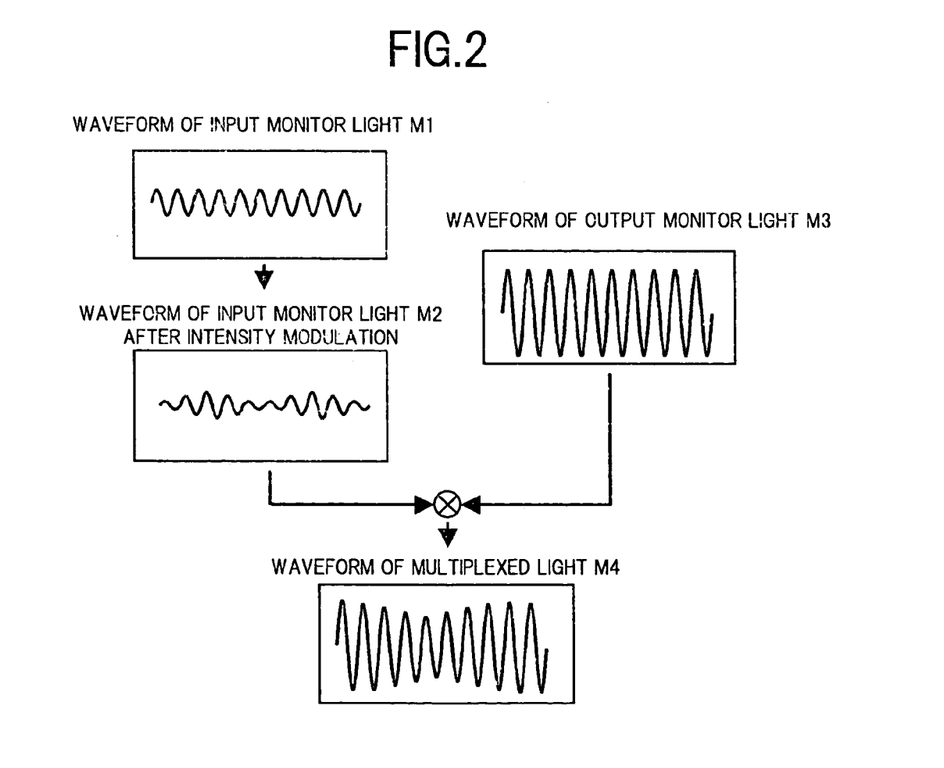
FIG. 2 is a diagram showing waveform examples of signal light components of a multiplexed light in the embodiment.
Figure 3:
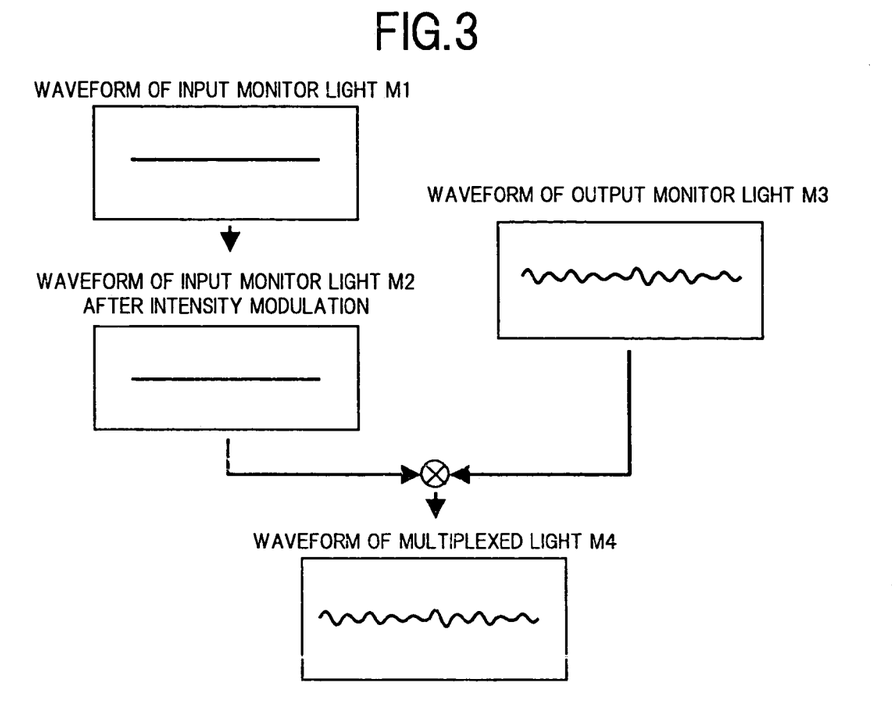
FIG. 3 is a diagram showing waveform examples of noise light components of the multiplexed light in the embodiment.

Here, a component corresponding to the signal light and a component corresponding to the noise light in the multiplexed light M4 will be specifically described. For the component corresponding to the signal light in the multiplexed light M4, for example as shown in FIG. 2, the input monitor light M2 intensity modulated at the frequency $2 \cdot \omega_f$ and the amplified output monitor light M3 are multiplexed so that the beat component of the frequency $\omega_f$ can be obtained. On the other hand, the component corresponding to the noise light in the multiplexed light M4, for example as shown in FIG. 3, exists only in the output monitor light M3 but does not exist in the input monitor lights M1 and M2. Therefore, the multiplexed light M4 has a waveform of steady state without the beat component. Accordingly, by detecting the multiplexed light M4 by the optical detector 17 and extracting only the frequency component in the vicinity of $\omega_f$ contained in the electrical signal output from the optical detector 17, by the frequency cutoff filter 18, it becomes possible to eliminate a voltage component corresponding to the noise light.

The operation of the present apparatus as described above will be further described in detail. Here, a wave number vector of the signal light is represented by $k=2\pi/\lambda$, and a time is represented by t, and further, an electric field of the input light to the optical amplifier is represented by Ein(k, t) and an electric field of the output light from the optical amplifier is represented by Eout(k, t).

If a branching ratio of the input monitor light M1 in the optical branching device 11, and a branching ratio of the output monitor light M3 in the optical branching device 15 are $\alpha(<1)$, $\beta(<1)$, respectively, an electric field Emix(k, t) of the lights multiplexed by the optical multiplexer 16 can be expressed by the following equation (1).

$$\text{Emix}(k,t)=\sqrt{\alpha}\cdot\text{Ein}(k,t)\cdot\text{Cos}(\omega_f t)+\sqrt{\beta}\cdot\text{Eout}(k,t) \qquad (1)$$

Further, the electric field Eout(k, t) of the output light from the optical amplifier 100 can be expressed by the following equation (2), if an electric field of the ASE light is Ease(k, t) and the signal gain is G.

$$\text{Eout}(k,t)=\sqrt{G}\cdot\text{Ein}(k,t)+\text{Ease}(k,t) \qquad (2)$$

Therefore, based on a relationship between the above equations (1) and (2), a relationship in the next equation (3) can be obtained.

$$Emix(k,t) = \sqrt{\alpha} \cdot Ein(k,t) \cdot \cos(\omega_f t) + \sqrt{\beta} \cdot \{\sqrt{G} \cdot Ein(k,t) + Ease(k, t)\} \quad (3)$$

The power Pmix of the light detected by the optical detector 17 can be expressed by the following equation (4), if a symbol indicating a time average is represented by < >.

$$Pmix(k) = \sum_k Pmix(k) = \sum_k \langle |Emix(k, t)|^2 \rangle \quad (4)$$

Here, if $1/\omega_f$ sufficiently longer than an averaged time, the relationship in the equation (4) can be expressed by the next equation (5).

$$Pmix(k) = \alpha \cdot \langle |Ein(k, t)|^2 \rangle \cdot \cos^2(\omega_f \cdot t) + G \cdot \beta \cdot \langle |Ein(k, t)|^2 \rangle + \quad (5)$$
$$\beta \cdot \langle |Ease(k, t)|^2 \rangle + 2 \cdot \sqrt{\alpha} \cdot \sqrt{\beta} \cdot \sqrt{G} \cdot \langle |Ein(k, t)|^2 \rangle \cdot \cos(\omega_f \cdot t) +$$
$$2 \cdot \sqrt{\alpha} \cdot \langle Ein(k, t) \cdot Ease(k, t) \rangle \cdot \cos(\omega_f \cdot t) +$$
$$2 \cdot \sqrt{\beta} \cdot \sqrt{G} \cdot \langle Ein(k, t) \cdot Ease(k, t) \rangle$$

Considering that there is not a correlation between the electric field Ein of the input light to the optical amplifier 100 and the electric field Ease of the ASE light, <Ein(k, t)·Ease(k, t)> becomes 0. Further, if $\cos^2(\omega \cdot t) = \{\cos(2 \cdot \omega_f t) + 1\}/2$ is used, the relationship in the equation (5) can be expressed by the following equation (6).

$$Pmix(k) = (\alpha/2) \cdot \langle |Ein(k, t)|^2 \rangle + G \cdot \beta \cdot \langle |Ein(k, t)|^2 \rangle + \quad (6)$$
$$\beta \cdot \langle |Ease(k, t)|^2 \rangle + (\alpha/2) \cdot \langle |Ein(k, t)|^2 \rangle \cdot \cos(2 \cdot \omega_f \cdot t) +$$
$$2 \cdot \sqrt{\alpha} \cdot \sqrt{\beta} \cdot \sqrt{G} \cdot \langle |Ein(k, t)|^2 \rangle \cdot \cos(\omega_f \cdot t)$$

Figure 4:
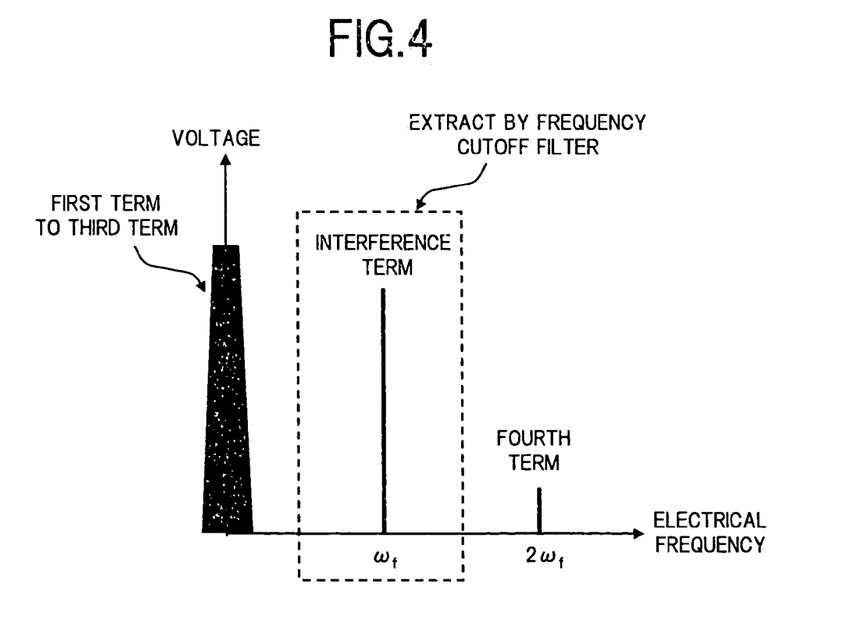
FIG. 4 is a diagram showing a spectrum of an electrical signal output from an optical detector in the embodiment.

In the equation (6), a first term represents the power of the input light, a second term represents the power of the output light and a third term represents a generation amount of the ASE light. Further, the last fifth term which is a term caused by multiplexing the input light and the output light, is called an interference term. For the electrical signal output from the optical detector 17, for example as shown in FIG. 4, voltages corresponding to the first to third terms in the equation (6) are concentrated in the vicinity of the frequency 0, the voltage corresponding to the fourth term has the component of the frequency $2 \cdot \omega_f$, and the voltage corresponding to the interference term has the component of the frequency $\omega_f$.

Accordingly, the voltage level of the frequency $\omega_f$ is changed in proportion to $\sqrt{G}$. Therefore, the component of the frequency $\omega_f$ is extracted by the frequency cutoff filter 18 to be processed by the gain detection circuit 19, thereby enabling the gain detection of the optical amplifier 100 for only the signal light component, which does not contain the noise light.

As described in the above, the signal gain detected by the gain detection circuit 19 is fed back to the optical amplifier 100, and the optical amplification operation control of AGC, ALC or the like is performed based on the signal gain, so that an extremely high accurate control can be realized without an influence of the noise light generated inside the optical amplifier 100.

Next, a specific embodiment of the one embodiment according to the present invention will be described.

Figure 5:
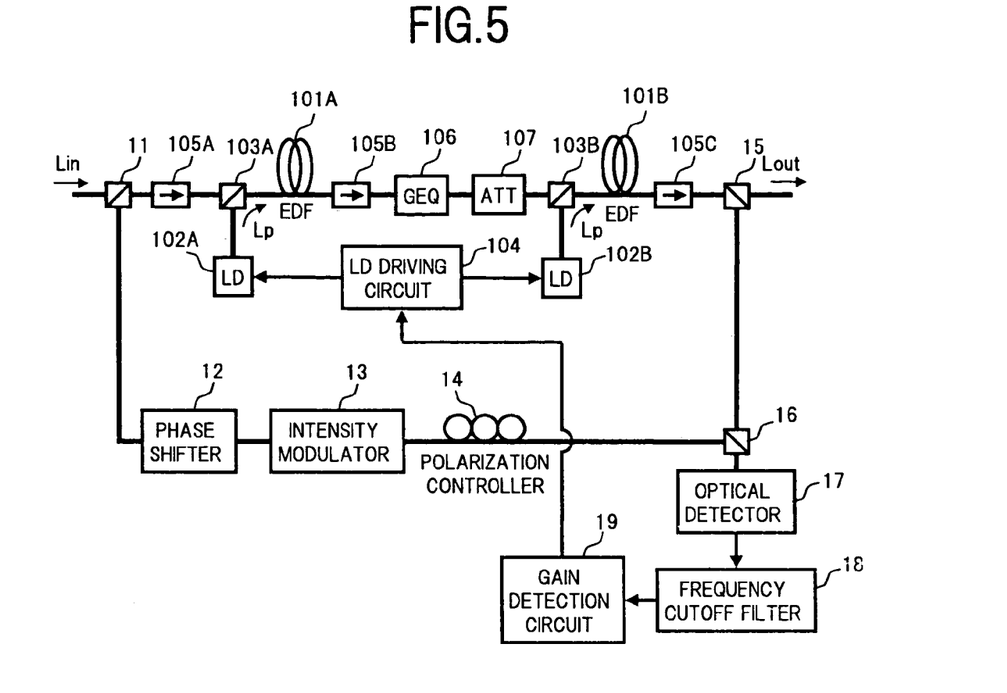
FIG. 5 is a block diagram showing a configuration of an embodiment in which the present invention is applied to an EDFA.

FIG. 5 is a block diagram showing a configuration of an embodiment in which the present invention is applied to an EDFA.

The configuration shown in FIG. 5 is an example in the case where for example a known EDFA in which the optical amplification is performed in two-stages, is used for the optical amplifier 100 in the configuration shown in FIG. 1. In this EDFA of two-stage configuration, a former stage optical amplification section consisting of an erbium doped fiber (EDF) 101A, a pumping light source (LD) 102A and a WDM coupler 103A, and a latter stage optical amplification section consisting of an EDF 101B, a pumping light source 102B and a WDM coupler 103B, are connected in series via an optical isolator 105B, a gain equalizer (GEQ) 106 and an optical attenuator 107.

The signal light Lin passed through the optical branching device 11 is input to the former stage optical amplification section via the optical isolator 105A, and passes through the WDM coupler 103A To be sent to the EDFA 101A. A pumping light Lp generated in the pumping light source 102A which is driven by an LD driving circuit 104, is supplied to the EDFA 101A via the WDM coupler 103A, so that the signal light propagated through the EDFA 101A is amplified due to the stimulated emission function of the pumped erbium. Further, when the signal light is amplified, the ASE light is generated to become the noise light, and is output together with the signal light.

The output light from the EDFA 101A is input to the latter stage optical amplification section via the optical isolator 105B, the gain equalizer 106 and the optical attenuator 107, and passes through the WDM coupler 103B to be sent to the EDF 101B. A pumping light Lp generated in the pumping light source 102B which is driven by the LD driving circuit 104, is supplied to the EDF 101B via the WDM coupler 103B, so that the signal light propagated through the EDF 101B is amplified and also the ASE light is generated. The light output from the EDF 101B is sent to the optical branching device 15 via an optical isolator 105C.

The gain equalizer 106 having a loss wavelength characteristic corresponding to gain wavelength characteristics of the former and latter optical amplification sections, is a known optical device for equalizing the power of the post-amplified signal lights having each wavelength. Further, the optical attenuator 107 is for adjusting the power of the light input to the latter optical amplification section, so that the power of the output light Lout is fixed at a required level.

In the EDFA of two-stage configuration, a part of the signal light Lin input to the former stage EDF 101A is branched by the optical branching device 11 as the input monitor light, and passes through the phase shifter 12, the intensity modulator 13 and the polarization controller 14 in this order, and the input monitor light modulated at the frequency $2 \cdot \omega_f$ is sent to the optical multiplexer 16. Further, a part of the output light Lout of the EDFA is branched by the optical branching device 15 as the output monitor light, to be sent to the optical multiplexer 16. Then, the input monitor light and the output monitor light are multiplexed by the optical multiplexer 16, and the beat component of the frequency $2 \cdot \omega_f$ generated in the multiplexed light is extracted by the optical detector 16 and the frequency cutoff filter 18, so that a total gain of the signal light component from which the ASE lights generated in the former and latter optical amplification sections are eliminated, is detected by the gain detection circuit 19. Here, the detection result of the gain detection circuit 19 is transmitted to the LD driving circuit 104, and the driving conditions of the respective pumping light sources 102A and 102B are feedback controlled, so that a gain in the EDFA becomes fixed. As a result, it becomes possible to perform the AGC of the EDFA with high accuracy.

Note, in the above embodiment, the description has been made on the EDFA of two-stage configuration. However, the EDFA to which the present invention is applied, is not limited to the above example, and the present invention is effective for EDFAs of various configurations. Further, it is surely possible to apply the present invention to a known rare-earth element doped optical fiber amplifier using, as an amplification medium, an optical fiber doped with a rare-earth element other than erbium.

Next, another embodiment of the apparatus to which the present invention is applied will be described.

Figure 6:
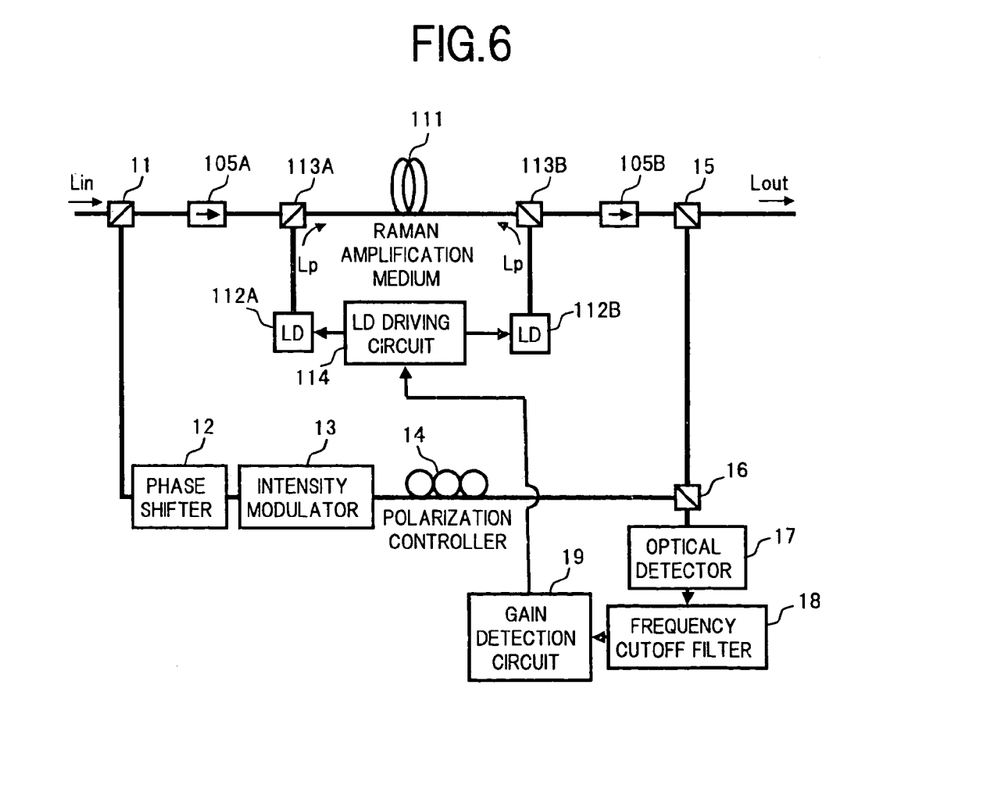
FIG. 6 is a block diagram showing a configuration of an embodiment in which the present invention is applied to a Raman amplifier.

FIG. 6 is a block diagram showing a configuration of an embodiment in which the present invention is applied to a Raman amplifier.

The configuration shown in FIG. 6 is an example in the case where for example a Raman amplifier which utilizes a dispersion shifted fiber (DSF) as an amplification medium, is used as the optical amplifier 100 in the configuration shown in FIG. 1. In this Raman amplifier, pumping lights Lp generated in pumping light sources (LD) 112A and 112B, which are driven by an LD driving circuit 114, are supplied in bi-directions from opposite ends of a dispersion shifted fiber 111 via WDM couplers 113A and 113B, so that the light propagated through the dispersion shifted fiber 111 is amplified utilizing a Raman effect being a non-linear phenomenon. This Raman effect is a phenomenon in which a gain peak appears at a frequency lower than a frequency of the pumping light Lp by 13.2 THz, and in a 1.5 µm band, the light in the wavelength band which is apart from the pumping light wavelength to the long wavelength side by about 100 nm, is amplified. Further, when the signal light is Raman amplified, the noise light is generated inside the Raman amplifier, due to the induced Raman scattering caused by the pumping light, to be output together with the Raman amplified signal light.

In the Raman amplifier of the above configuration, a part of the signal light Lin input to the dispersion shifted fiber 111 is branched by the optical branching device 11 as the input monitor light, and passes through the phase shifter 12, the intensity modulator 13 and the polarization controller 14 in this order, and the input monitor light modulated at the frequency $2 \cdot \omega_f$ is sent to the optical multiplexer 16. Further, a part of the output light Lout of the Raman amplifier is branched by the optical branching device 15 as the output monitor light to be sent to the optical multiplexer 16. Then, the input monitor light and the output monitor light are multiplexed by the optical multiplexer 16, and the beat component of the frequency $\omega_f$ generated in the multiplexed light is extracted by the optical detector 16 and the frequency cutoff filter 18, so that a Raman gain for the signal light component from which the noise light generated inside the dispersion shifted fiber 111 due to the induced Raman emission is eliminated, is detected by the gain detection circuit 19. The detection result of the gain detection circuit 19 is transmitted to the LD driving circuit 114, and driving conditions of the respective pumping sources 112A and 112B are feedback controlled, so that the Raman gain reaches a desired value. As a result, it becomes possible to perform the optical amplification operation in the Raman amplifier with high accuracy.

Note, in the above embodiment, one example has been shown in which the dispersion shifted fiber 111 is made the Raman amplification medium. However, the Raman amplification medium is not limited thereto, and it is possible to use a transmission path fiber such as a 1.3 µm zero-dispersion single mode fiber or the like, or a Raman amplification fiber having a high non-linear factor. Further, here, the configuration example has been shown in which the pumping lights Lp are supplied in the bi-directions from the opposite ends of the dispersion shifted fiber 111. However, a forward pumping configuration or a backward pumping configuration may be applied in which the pumping light Lp is supplied in one direction from one end of the dispersion shifted fiber 111.

Next, a further embodiment of the apparatus to which the present invention is applied will be described.

Figure 7:
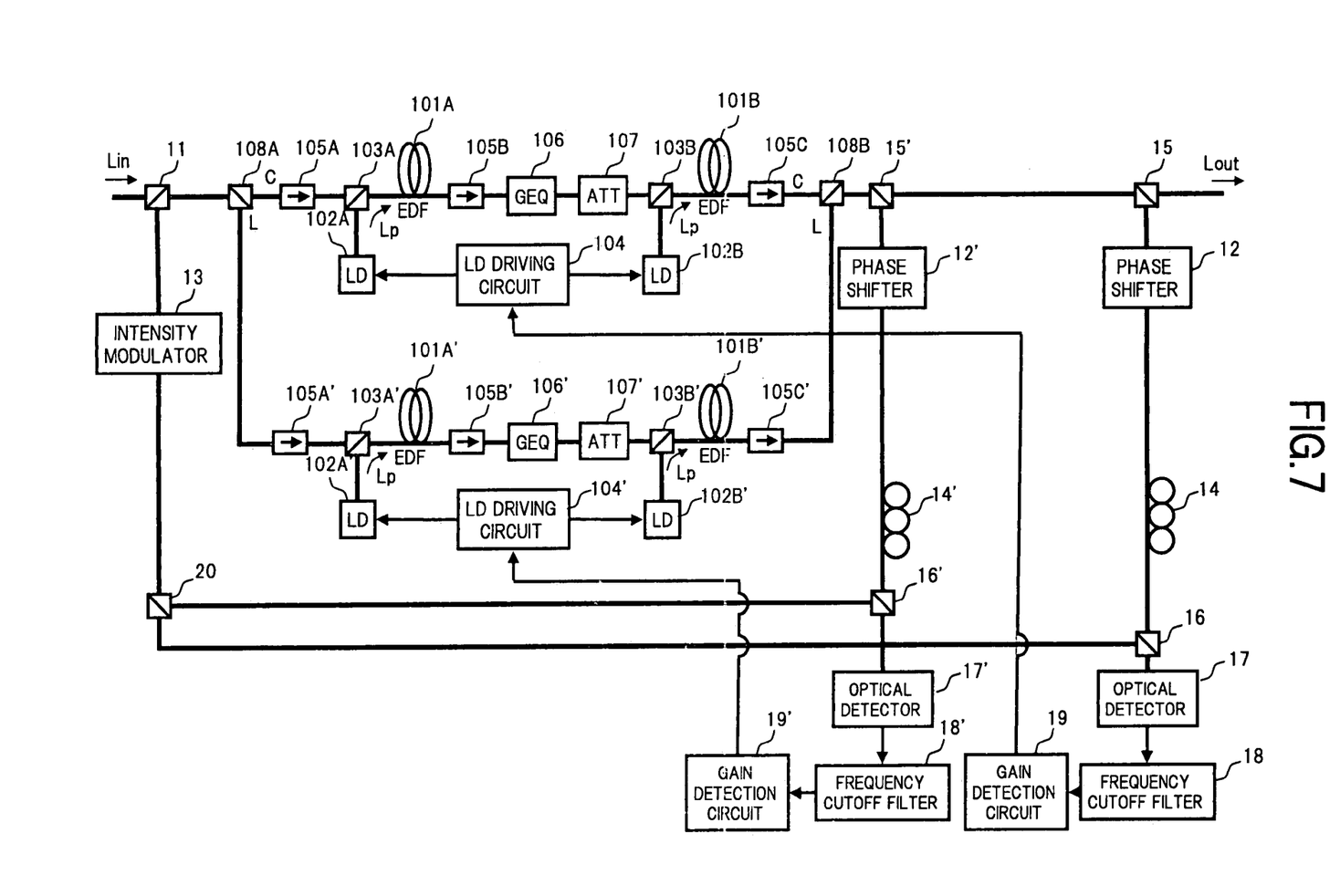
FIG. 7 is a block diagram showing a configuration of an embodiment in which the present invention is applied to an EDFA corresponding to a C-band and an L-band.

FIG. 7 is a block diagram showing an embodiment in which the present invention is applied to an EDFA corresponding to a C-band and an L-band.

In FIG. 7, the EDFA corresponding to the C-band and the L-band has a configuration in which an optical amplification section for C-band using the EDFA corresponding to a single band shown in FIG. 5, and an optical amplification section for L-band having a configuration similar to the above, are connected in parallel using a C/L separating coupler 108A and a C/L multiplexing coupler 108B. Note, a reference numeral of each constitutional element of the optical amplification section for L-band is attached with (') corresponding to each constitutional element of the optical amplification section for C-band.

In a configuration of a monitor system of the signal light input and output to and from the EDFA as described above, here, for example, a part of the signal light Lin given to the C/L separating coupler 108A is branched by the optical branching device 11 as the input monitor light, and the input monitor light is given to the intensity modulator 13 to be subjected to the intensity modulation at the frequency $2 \cdot \omega_f$, and then the modulated light is branched into two by an optical branching device 20 to be sent to the optical multiplexers 16 for C-band and the optical multiplexer 16' for L-band, respectively. Further, on an output side, a part of the output light multiplexed by the C/L multiplexing coupler 108B is branched by the optical branching devices 15 and 15', respectively, to generate an output monitor signal for C-band and an output monitor signal for L-band. The output monitor signals corresponding to the respective bands are sent to the optical multiplexers 16 and 16', via the phase shifters 12 and 12', and the polarization controllers 14 and 14', respectively, so that the output monitor signals whose phases and polarization states are approximately coincident with those of the input monitor signal, are input to the optical multiplexers 16 and 16'. The multiplexed lights output from the optical multiplexers 16 and 16' are detected by the optical detectors 17 and 17', and thereafter, the beat components of the frequency $\omega_f$ extracted by the frequency cutoff filters 18 and 18' are sent to the gain detection circuit 19 and 19', respectively, so that total gains of the signal light components from which the ASE lights generated in the optical amplification sections for C-band and L-band are eliminated, are detected, respectively. Here, the detection results of the gain detection circuits 19 and 19' are transmitted to the LD driving circuits 104 and 104', so that the driving conditions of the pumping light sources 102A and 102B, and 102A and 102B' are feedback controlled. As a result, it becomes possible to perform the AGC of the EDFA corresponding to the C-band and L-band with high accuracy.

Note, in the above embodiment, the description has been made on the EDFA in which the signal lights of C-band and L-band are collectively amplified. However, it is also possible to apply the present invention to a rare-earth element doped optical fiber amplifier, which collectively amplifies optical signals of three or more different bands.

What is claimed is:

1. A gain monitoring method for an optical amplifier comprising:
   branching a part of a signal light input to said optical amplifier as an input monitor light;
   branching a part of a light output from said optical amplifier as an output monitor light;
   modulating said branched input monitor light;
   multiplexing said modulated input monitor light and said branched output monitor light;
   receiving said multiplexed monitor light to convert it into an electrical signal, and thereafter, extracting an interference component generated due to said modulated input monitor light and said branched output monitor light, which is contained in said electrical signal; and
   detecting a gain for the signal light in said optical amplifier based on said extracted interference component.

2. A gain monitoring method for an optical amplifier according to claim 1,
   wherein a phase and a polarization state of at least one of said input monitor light and said output monitor light is adjusted, so that the phase and the polarization state of said modulated input monitor light is approximately coincident with the phase and the polarization state of said branched output monitor light, and thereafter, the input monitor light and the output monitor light are multiplexed.

3. A gain monitoring method for an optical amplifier according to claim 1,
   wherein said branched input monitor light is intensity modulated in accordance with a modulation signal having a frequency lower than a modulation frequency of the signal light.

4. A gain monitoring apparatus for an optical amplifier, comprising:
   a first optical branching section that branches a part of a signal light input to said optical amplifier as an input monitor light;
   a second optical branching section that branches a part of a light output from said optical amplifier as an output monitor light;
   a modulating section that modulates the input monitor light branched in said first optical branching section;
   an optical multiplexing section that multiplexes the input monitor light modulated in said modulating section and the output monitor light branched in said second optical branching section;
   an optical detecting section that receives the multiplexed light output from said optical multiplexing section to convert it into an electrical signal;
   a filter section that extracts an interference component generated due to the input monitor light modulated in said modulating section and the output monitor light branched in said second optical branching section, which is contained in the electrical signal output from said optical detecting section; and
   a gain detecting section that detects a gain for the signal light in said optical amplifier based on the interference component extracted in said filter section.

5. A gain monitoring apparatus for an optical amplifier according to claim 4, further comprising:
   a phase adjusting section that adjusts a phase of at least one of said input monitor light and said output monitor light, so that the phase of the input monitor light modulated in said modulating section is approximately coincident with the phase of the output monitor light branched in said second branching section; and
   a polarization state adjusting section that adjusts a polarization state of at least one of said input monitor light and said output monitor light, so that the polarization state of the input monitor light modulated in said modulating section is approximately coincident with the polarization state of the output monitor light branched in said second branching section.

6. A gain monitoring apparatus for an optical amplifier according to claim 4,
   wherein an operation of said optical amplifier is controlled according to the detection result of said gain detecting section.

7. A gain monitoring apparatus for an optical amplifier according to claim 4,
   wherein said modulating section intensity modulates said input monitor light in accordance with a modulation signal having a frequency lower than a modulation frequency of the signal light.

8. A gain monitoring apparatus for an optical amplifier according to claim 4,
   wherein said optical amplifier is a rare-earth element doped optical fiber amplifier.

9. A gain monitoring apparatus for an optical amplifier according to claim 4,
   wherein said optical amplifier is a Raman amplifier.

10. A gain monitoring apparatus for an optical amplifier according to claim 4,
    wherein said optical amplifier is a semiconductor optical amplifier.

11. A gain monitoring apparatus for an optical amplifier according to claim 4,
    wherein said optical amplifier includes a plurality of optical amplification sections corresponding to a plurality of signal wavelength bands, and said optical amplification sections are connected in parallel; and
    each of said second optical branching section, said optical multiplexing section, said optical detecting section, said filter section and said gain detecting section is provided in plural numbers corresponding to said plurality of optical amplification sections.

* * * * *